US005309217A

United States Patent [19]
Simon et al.

[11] Patent Number: 5,309,217
[45] Date of Patent: May 3, 1994

[54] FOURIER SPECTROMETER

[75] Inventors: Arno Simon, Karlsruhe; Jürgen Gast, Rheinstetten; Axel Keens, Karlsruhe, all of Fed. Rep. of Germany

[73] Assignee: Bruker Analytische Messtechnik, Fed. Rep. of Germany

[21] Appl. No.: 872,433

[22] Filed: Apr. 23, 1992

[30] Foreign Application Priority Data

Apr. 27, 1991 [DE] Fed. Rep. of Germany ..... 41138864

[51] Int. Cl.$^5$ .............................................. G01B 9/02
[52] U.S. Cl. ................................... 356/346; 356/345
[58] Field of Search ............................. 356/345, 346

[56] References Cited

U.S. PATENT DOCUMENTS

| Re. 32,912 | 4/1989 | Doyle | 356/244 |
|---|---|---|---|
| 4,383,762 | 5/1983 | Burkert | 356/346 |
| 4,847,878 | 7/1989 | Badeau | 377/19 |
| 5,047,653 | 9/1991 | Garcia et al. | 356/345 X |
| 5,066,990 | 11/1991 | Rippel | 356/346 |
| 5,150,172 | 9/1992 | Brierley | 356/346 |
| 5,196,902 | 3/1993 | Soloman | 356/346 |

FOREIGN PATENT DOCUMENTS

| 3112157 | 10/1982 | Fed. Rep. of Germany . |
|---|---|---|
| 3005520C2 | 5/1983 | Fed. Rep. of Germany . |
| 3920117 | 1/1991 | Fed. Rep. of Germany . |
| 287098A5 | 2/1991 | Fed. Rep. of Germany . |
| 4111287 | 10/1991 | Fed. Rep. of Germany . |
| 0256991 | 6/1988 | German Democratic Rep. . |
| 1010277 | 11/1965 | United Kingdom . |

*Primary Examiner*—James C. Housel
*Assistant Examiner*—Harold Y. Pyon
*Attorney, Agent, or Firm*—Cesari and McKenna

[57] ABSTRACT

An optical or Fourier infrared Fourier spectrometer with a two-beam interferometer with which the mirror drive is effected via two retroreflectors which are located on two 180° displaced arms of a double pendulum. Deflecting mirrors are arranged between the beam splitter and the retroreflectors. The otherwise usual retroreflecting mirrors are not present. The beam splitter is displaced with respect to the plane of the pendulum. Thereby, a stable, easily aligned, and compact configuration is effected.

17 Claims, 3 Drawing Sheets

FOURIER SPECTROMETER

FIELD OF THE INVENTION

The invention concerns an optical or infrared Fourier spectrometer with a two-beam interferometer whereby configured as retroreflectors and are located on a common rotatably mounted rigid pendulum.

DESCRIPTION OF THE PRIOR ART

Such a spectrometer is known in the art from DE-PS 30 05 520 (corresponds to U.S. Pat. No. 4383762).

The two-beam interferometer of the spectrometer known in the art which is intended in particular to be applied to radiative measurements in cryostats on board of space flight vehicles, consists of a beam splitter in the optical measurement path, two reflector systems and a detector system for the registration of measured radiation, whereby both reflector systems are configured as rotatably mounted retroreflectors and are optical systems which are insensitive with respect to spatial tilting as well as to sidewards displacement, whereby each reflector of the two reflector system is attached to a common rigid pendulum. Preferentially, each retroreflector is arranged at an equal distance from the pendulum mounting at the end of one arm of a rigid two arm pendulum whose arms, are orthogonal to each other. A balancing weight can be provided for at the end of an auxiliary arm, so that the center of gravity of the pendulum structure coincides with the pendulum axis. In an embodiment, a pendulum exhibiting only one pendulum arm is provided for on which both retroreflectors are arranged at different distances from the axis.

With the two-beam interferometer of the above mentioned spectrometer, the measuring radiation is separated by means of a beam splitter into two partial radiations both of which, after travelling through a first and second optical system respectively, said optical systems each consisting of a retroreflector and a stationary back reflecting mirror, are reflected back into themselves and after again passing through the beam splitter are caused to interfere with another and the interfering partial radiations are guided to a detector for spectroscopic analysis of the interference image. The retroreflectors are attached to one or two pendulum arms of the pendulum which can oscillate about a pendulum mount within preset tolerance limits. This double pendulum interferometer can swivel about a rotation axis in order to produce an optical path length difference; in this fashion the optical path of the partial radiation in the first interferometer arm, under rotation in a clockwise direction, is shortened whereas the optical path of the partial radiation in the second interferometer arm is simultaneously lengthened or vice versa depending on the direction of the pendulum motion.

In all double pendulums of DE-PS 30 05 520, the center of gravity of the pendulum lies either outside of the pendulum axis which increases frictional forces or an auxiliary arm with a balancing weight is provided for which increases the space requirements and the moment of inertia of the pendulum. The presence of the back reflecting mirror has the consequence that at most half of the cross section of the retroreflector can be utilized. In addition alignment errors in this mirror or a disalignment due, for example, to thermal distortions, and/or an optical error of another optical component, for example, the beam splitter have negative consequences. DE-PS 30 05 520 mentions that "one can do without the stationary mirror of the full compensating optical system if one attaches the retroreflectors on the two pendulum arms at equal distances from the pendulum mount." This is, however, not possible in any of the embodiments shown and discussed. Although, no adjustment devices are explicitly mentioned, one can nevertheless assume that the rigidly mounted back reflecting mirror can be configured to be alignable, which, however, is no longer possible if it is absent. The remaining possibility would then be to provide each of the retroreflectors attached to the pendulum arms with an alignment device. However alignment devices on movable elements cause further problems. In addition the moment of inertia of the pendulum is increased. In all embodiments all optical components are located in a plane.

Known in the art from the German Democratic Republic Patent Manuscript DD 287 098 A5 is a multichannel Fourier spectrometer exhibiting a plurality of corner mirrors with parallel edges as reflectors which are connected to the drive mechanism and are arranged rotatably with respect to the mid-point and symmetrically to the plane of the beam splitter, whereby the edges of all corner mirrors lie in a plane whose line of intersection with the beam splitter plane forms the rotation axis of the corner mirror configuration. In addition deflecting mirrors are provided for which are arranged symmetrically with respect to the beam splitter plane.

DD PS 0 287 098 is principally concerned with extending a multi-channel Fourier spectrometer configuration through additional channels, whereby corner mirrors are arranged pairwise on opposite sides. The goal of DD PS 0 287 098 is to provide for spectral measurements over a wide wavelength region without requiring a mechanical exchange of construction groups. As in DE-PS 30 05 520 the rotating reflector principle is utilized, but with a 180° configuration for the pendulum arm, without back reflecting mirror, and with corner mirrors instead of three dimensional retroreflectors. Thereby the reflector system of DD PS 0 287 098 is not fully compensated. All components of the configuration shown in the figure are coplanar.

The purpose of the invention is to further improve a spectrometer of the above mentioned kind with exactly two three-dimensional retroreflectors in such a fashion that more than half of the cross section of the retroreflectors can be utilized, that the center of gravity of the double pendulum lies, to a good approximation, in the axis without substantially increasing the moment of inertia, that the spectrometer only includes mirrors to whose disalignment the spectrometer is insensitive, while, in particular, allowing for a compact construction configuration with a short optical path.

BRIEF SUMMARY OF THE INVENTION

This purpose is achieved in that both arms of the pendulum are arranged approximately 180° with respect to each other, whereby both retroreflectors are so configured, or when appropriate, so displaced or rotated that the center of gravity of the pendulum, including the massive retroreflectors, lies in the the spectrometer does not include any back reflecting mirrors, rather, the partial beams coming from the beam splitter are guided, by means of one reflecting mirror each, mounted rigidly in the spectrometer, onto both retroreflectors which, for their part, are located at equal distances from the pendulum axis on opposite arms of the pendulum, whereby the deflecting mirrors are so oriented that both partial beams of the interferometer which come from the beam splitter are deflected out of their common plane which, on the other hand, means that the pendulum axis is not perpendicular to the plane. Preferentially, the pendulum axis is parallel to this plane, that is to say, the pendulum swings in a plane which is perpendicular to the plane formed by the partial beams from the beam splitter. This has the additional advantage that the optical path of the partial beams from the beam splitter to the retroreflector and back can be further minimized while simultaneously minimizing the distance between the retroreflector and the pendulum axis so that a particularly compact spectrometer construction form is possible. As short an optical path as possible, for a given pendulum travel, is advantageous since the optical path, in general, enters linearly into errors caused by disalignment of the construction elements. Disalignment, by way of example, through thermal expansion of a construction element, produces, for shorter optical paths, correspondingly smaller errors.

In this manner the purpose of the invention is completely achieved.

In a preferred embodiment of the invention the deflecting mirrors are adjustable. This has the advantage that it is not necessary to perform alignment on movable parts.

In a further preferred embodiment of the invention the retroreflectors of the double pendulum are rotated in opposite senses with respect to each other and their corners form an angle with the pendulum axis of more than 180°.

This has the advantage that, with an extremely compact construction, the center of gravity of the pendulum, taking into consideration the rather massive retroreflectors, lies exactly in the axis.

In a further preferred form of the invention, the pendulum axis is horizontal and the beam splitter is displaced sidewards and arranged over the pendulum axis, which allows for a space saving mounting into the spectrometer housing.

In the following the invention is further explained with reference to the drawings.

Clearly, the above mentioned features and the features which will be explained below are applicable not only in the respective given combinations but also in other combinations or individually without departing from the framework of the present invention. Shown are:

DETAILED DESCRIPTION OF THE PREFERRED EMBODIMENT

Figure 1:
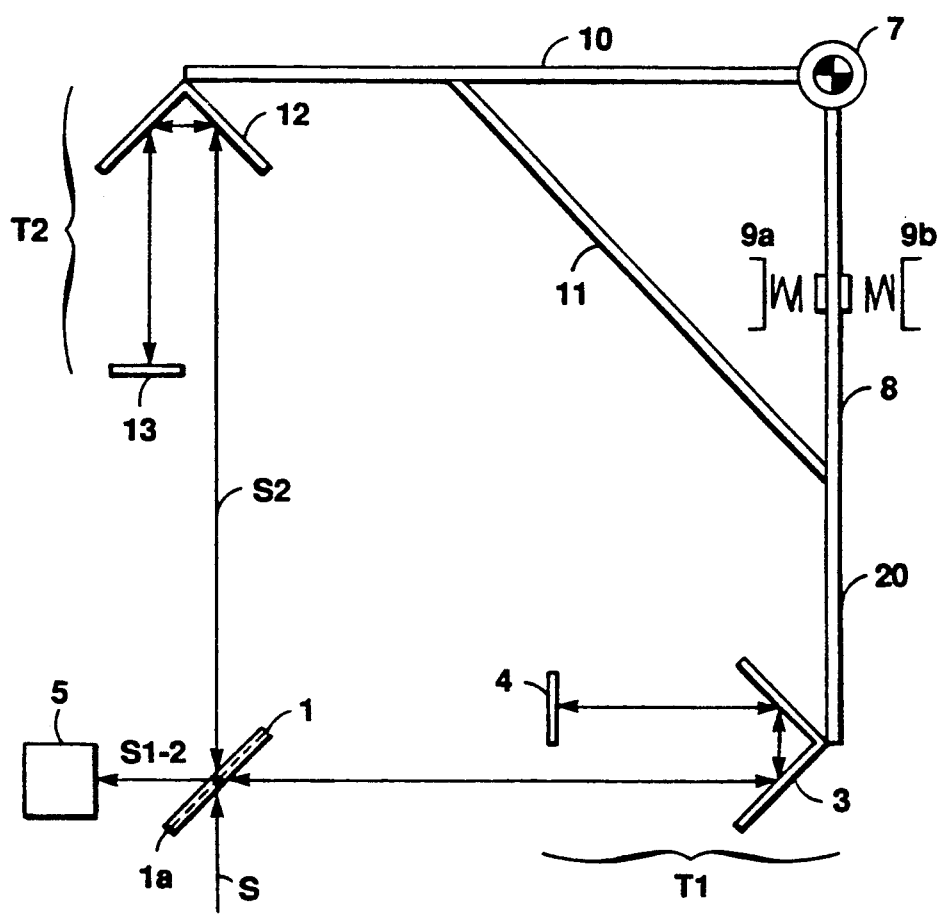
FIG. 1 A two-beam interferometer of a spectrometer with two retroreflectors on a double pendulum according to prior art.

FIG. 1 shows in a schematic fashion details of a Fourier spectrometer two-beam interferometer known in the art from DE PS 30 05 520. The measurement radiation S is split by means of the beam splitter 1 into two partial radiations S1 and S2 which, after passing through the optical system T1 (combination of the retroreflector 3 with the fixed back reflecting mirror 4) or T2 (combination of the retroreflector 12 with the back reflecting mirror 13) respectively, are reflected back into themselves. After again passing through the beam splitter 1 they are caused to come into interference with another and the interfering partial radiation S1-S2 is guided to a detector 5 for a spectroscopic analysis of the interference image.

The retroreflectors 3, 12 are each attached to the end of the rigid perpendicular arms 8,10 of the pendulum 20. The pendulum 20 can oscillate within tolerance limits about the bearing 7. The drive is effected by means of drive magnets 9a,b.

The center of gravity of the pendulum 20 does not lie in the axis 7. A tilting of the back reflecting mirror, that is to say a deviation from 90° reflection due to, for example, thermal distortions, would manifest itself in a tilting of the reversely travelling partial radiations S1 and S2 and thereby cause disturbances in the interferogram. Accordingly the interferometer according to FIG. 1 is not insensitive to tilting of the back reflecting mirror. In addition, optical interferences, which vary linearly across the beam diameter, for example, from the beam splitter, are, in principal, not compensated for since the retroreflectors are not each symmetrically illuminated by the incident or reflected beams. The mirrors 4, 13 cover a portion (in general 50%) of the area of the retroreflectors. In the configuration according to FIG. 1, it is not possible to eliminate mirrors 4 and 13 since, in this event, the partial beams S1 and S2 obviously are no longer reflected from the same region of the beam splitter 1. However, it is possible to build a symmetric configuration which would allow this. Such a configuration is, by way of example, disclosed in EP-A 0 314 103.

Figure 2A:
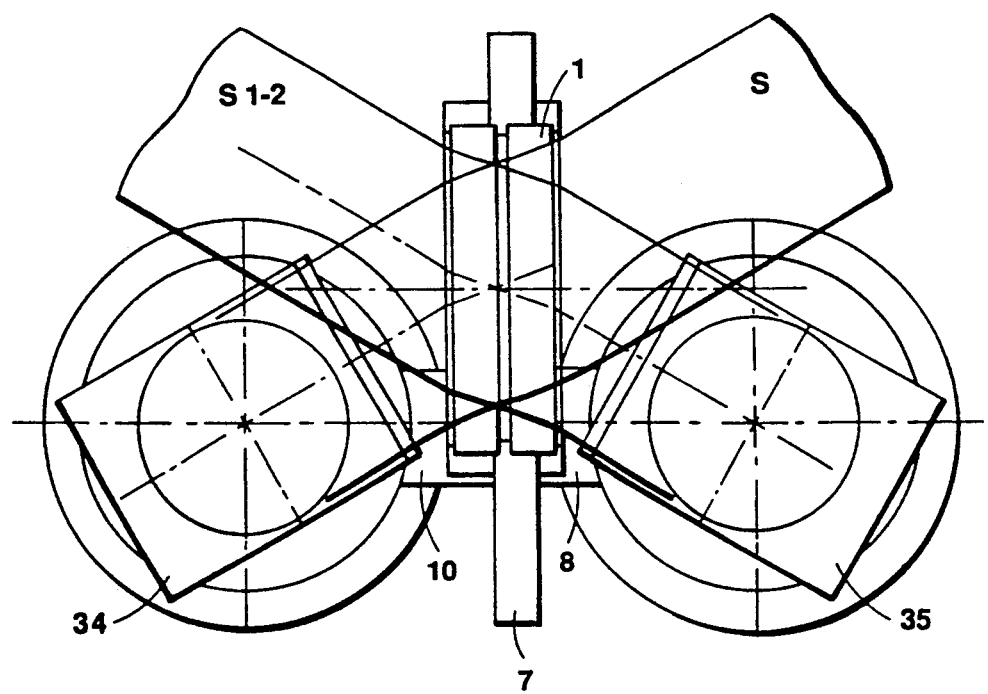
FIG. 2a-2b An embodiment of the two-beam interferometer of a spectrometer in accordance with the invention; a) top view, b) side view.
Figure 2B:
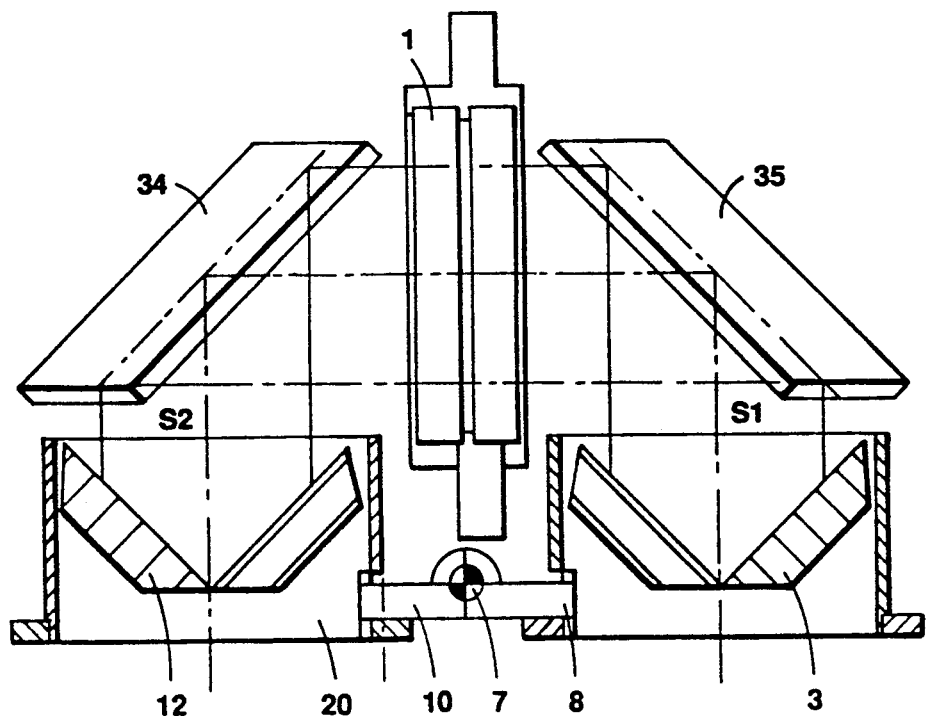

FIG. 2a shows a top view of the principal components of the interferometer of an embodiment of the spectrometer in accordance with the invention. The reference symbols correspond largely to those in FIG. 1. After leaving beam splitter 1, the partial beams S1, S2 reach the deflecting mirrors 34,35 which are arranged above the pendulum 20 and thereby largely cover the retroreflectors. The double pendulum 20, with the arms 8 and 10, is rotatable about the horizontal axis 7. FIG. 2b shows the same assembly in a side view. One should note that the beam splitter 1, on the one hand, and the deflecting mirrors 34,35 and the double pendulum 20 with the retroreflectors 3,12, on the other hand, are not in the same plane. The partial beams S1 and S2 are reflected from the deflecting mirrors 34,35 through an angle of 90°. The retroreflectors 3,12 are so arranged and, if appropriate, displaced that the center of gravity of the double pendulum lies in its axis 7.

Figure 3A:
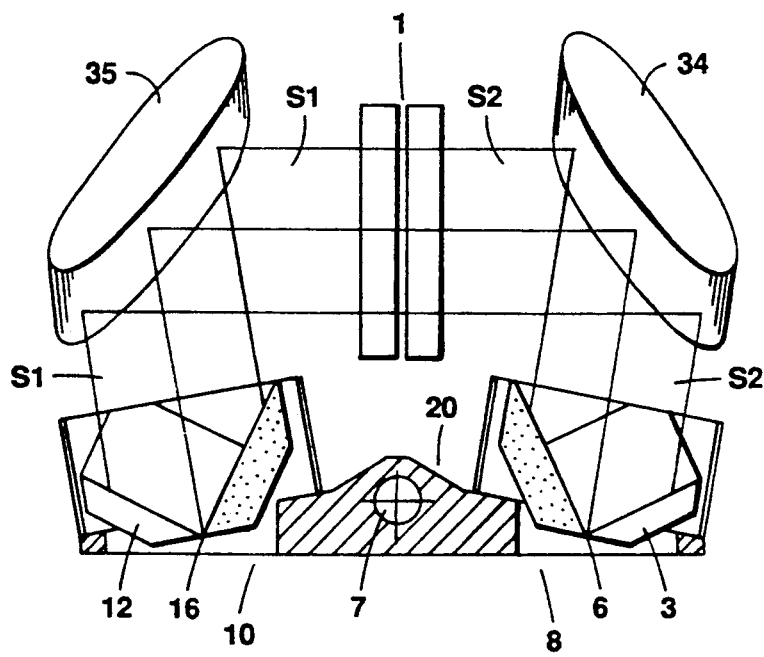
FIG. 3a-3c A preferred embodiment of the two-beam interferometer of a spectrometer in accordance with the invention; a) cross section, b) top view, c) side view.

FIG. 3a) through 3c) shows in a likewise schematic representation of the interferometer, a preferred embodiment of a spectrometer in accordance with the invention. A measuring beam S reaches a beam splitter 1. The transmitted or reflected partial beams S2 and S1 are reflected from deflecting mirrors 34,35 onto retroreflectors 3,12. The retroreflectors 3,12 are located at the ends of the arms 8,10 of a pendulum 20 which rotatable about an axis 7. Both arms 8,10 are equally long and describe an angle of 180° or somewhat more, that is to say, the connecting line between the axis 7 and the points 6,16 of the retroreflectors subtend an angle of somewhat more than 180° The partial beams S1 and S2 are not parallel to another as they travel between the deflecting mirrors 34 or 35 and the retroreflectors 3 or 12, rather are largely perpendicular to the connecting line between the pendulum axis 7 and the points 6,16 of the retroreflectors 12,3. They illuminate the retroreflectors 3 and 12 symmetrically. The retroreflectors 3 and 12 are each arranged in a somewhat rotated fashion so that they are oriented in the direction of the deflecting mirrors 34,35 when the pendulum 20 is in its equilibrium position. The partial beams S1 and S2 are reflected back into themselves from the retroreflectors 3 and 12 before again reaching, by means of the deflecting mirror 34,35, the beam splitter 1. The interfering beams S1-2 finally reach a detector.

In comparison to prior art according to FIG. 1, the back reflecting mirrors 4 and 13 are not present in FIGS. 2 and 3 and, due to the special geometry of the pendulum arms 8 and 10 and in FIG. 3 the rotation of the rather massive retroreflectors 3 and 12, the center of gravity of the pendulum 20 lies largely on the axis 7 without requiring an additional arm. The cross section of the retroreflectors 3,12 is, in principle, fully usable whereas in prior art according to DE-PS 30 05 020 only up to 50% was 13 are in the way. The symmetric illumination has the effect that errors in the optical components, for example, of beam splitter 1, which vary linearly over the beam cross section are, in this configuration, compensated for.

In contrast to FIG. 1, in the interferometers of FIGS. 2 and 3, there are two additional mirrors 34,35 from which the beams S1 and S2 are reflected before and after reflection from the retroreflector 3,12 and, in fact, not through 180°. In contrast to the back reflecting mirrors 4,13 small tiltings of the deflecting mirrors 34,35, in first approximation, do not cause a tilting of the partial beams S1 and S2 when travelling back in the direction of the beam splitter, and do not thereby disturb the interferogram. The configurations according to FIGS. 2 and 3 are insensitive with respect to small tiltings of the fixed deflecting mirrors 34,35.

Figure 3B:
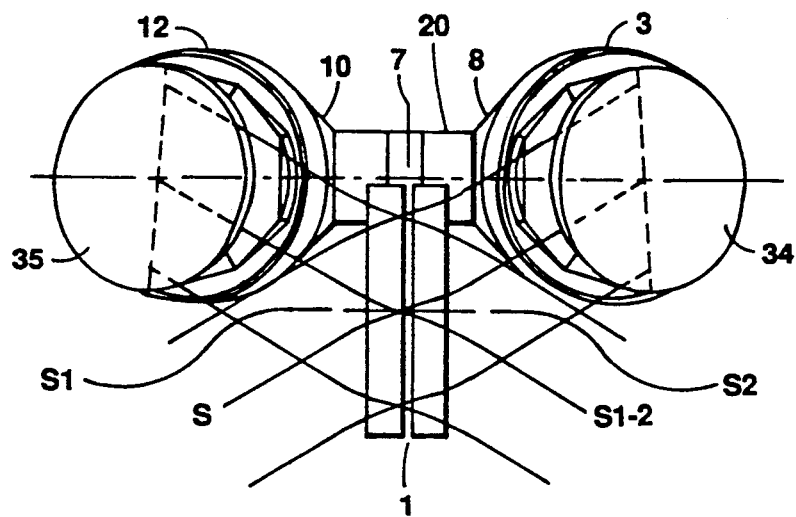
Figure 3C:
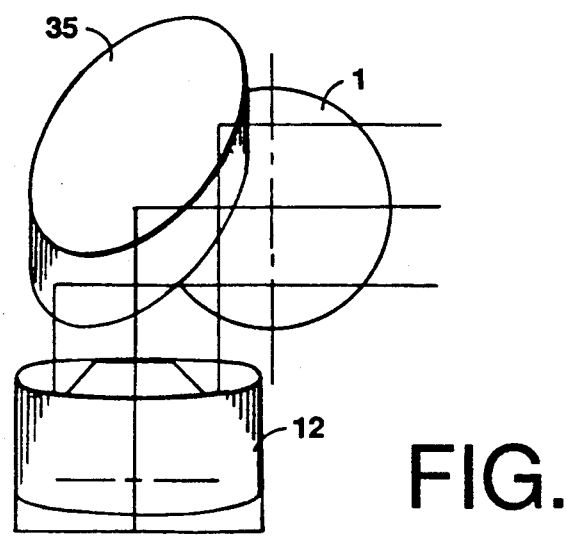

Whereas, in prior art according to FIG. 1 but also according to DD PS 0 287 098 A5, all optical components of the interferometer are largely arranged in a single plane, FIGS. 2 and 3 show that in the spectrometer according to the invention this is no longer the case. In the examples of FIGS. 2 and 3, the axis 7 is horizontal and the pendulum 20 is located below (or above) the deflecting mirror 34,35. This allows a particularly compact construction assembly with a short optical path between beam splitter 1 and retroreflectors 3,12. Preferentially, the projection of the deflecting mirrors' 34,35 reflection angle onto the plane of the drawing of FIG. 3a assumes a value of somewhat less than 90°, that is to say the initially horizontal parallel partial beams S1, S2 are redirected nearly vertically. The projection of the reflection angle onto the plane of the drawing of FIG. 3c assumes preferentially a value of exactly 90°.

FIG. 3a shows a cross section, FIG. 3b a top view, and FIG. 3c a side view of the essential components of the interferometer. The reference symbols correspond to those of FIGS. 1 and 2. Leaving the beam splitter 1, the partial beams S1 and S2 reach the deflecting mirror 34,35 which is arranged above the pendulum 20 and thereby, in FIG. 3b, largely covers the retroreflectors. The double pendulum 20 with the arms 8 and 10 is rotatable about the horizontal axis 7. Note that, the beam splitter 1, on the one hand, and the deflection mirrors 34,35 and the double pendulum 20 with the retroreflectors 3,12, on the other hand, are not in the same plane. In particular in FIG. 3b one notices that the partial beams S1 and S2 travel from the beam splitter 1 which, in a top view is sidewards displaced from the plane of the pendulum, horizontally and meet on the FIG. 3a that they are deflected nearly vertically.

We claim:

1. A Fourier spectrometer for generating an interference pattern from a measurement beam, the spectrometer comprising:
   a beam splitter for dividing the measurement beam into a first partial beam and a second partial beam;
   a rotatably-mounted rigid pendulum;
   a pair of movable retroreflectors, each of the retroreflectors being mounted on the pendulum;
   a pair of fixed deflecting mirrors, each of the deflecting mirrors being physically located with respect to the beam splitter and to the retroreflectors so that the first partial beam travels along a first optical path and is deflected from one of the pair of fixed mirrors along a second optical path onto one of the pair of retroreflectors where the first partial beam is reversed in direction to retrace the first and second optical paths and return to the beam splitter and the second partial beam travels along a third optical path, is deflected from one of the pair of fixed mirrors along a fourth optical path onto one of the pair of retroreflectors where the second partial beam is reversed in direction to retrace the third and fourth optical paths and return to the beam splitter and wherein the first and third optical paths lie in a first plane, the second and fourth optical paths lie in a second plane and the first and the second plane are substantially perpendicular.

2. A spectrometer according to claim 1 wherein the first and the second planes are exactly perpendicular.

3. A spectrometer according to claim 1, wherein the first and second optical paths lie in a third plane and the first and third planes intersect to form an acute angle.

4. A Fourier spectrometer for generating an interference pattern from a measurement beam, the spectrometer comprising:
   a beam splitter for dividing the measurement beam into a first partial beam and a second partial beam;
   a rotatably-mounted rigid pendulum having an axis of rotation;
   a pair of movable retroreflectors, each of the retroreflectors being mounted on the pendulum at equal distances from the pendulum axis so that the pendulum and retroreflectors together have a center of gravity which coincides with the pendulum axis;
   a pair of fixed deflecting mirrors, each of the deflecting mirrors being physically located with respect to the beam splitter and to the retroreflectors so that the first partial beam travels along a first optical path and is deflected from one of the pair of fixed mirrors along a second optical path onto one of the pair of retroreflectors where the first partial beam is reversed in direction to retrace the first and second optical paths and return to the beam splitter and the second partial beam travels along a third optical path, is deflected from one of the pair of fixed mirrors along a fourth optical path onto one of the pair of retroreflectors where the second partial beam is reversed in direction to retrace the third and fourth optical paths and return to the beam splitter and wherein the first and third optical paths lie in first plane, the second and fourth optical paths lie in a second plane and the first and the second plane are substantially perpendicular.

5. A spectrometer according to claim 4 wherein each retroreflector has a corner and the angle between one retroreflector corner and the pendulum axis and the pendulum axis and the other retroreflector corner is between 180° and 270°.

6. A spectrometer according to claim 5 wherein the angle between one retroreflector corner and the pendulum axis and the pendulum axis and the other retroreflector corner is between 180° and 210°.

7. A spectrometer according to claim 4 further comprising an alignment mechanism for moving the deflecting mirrors to align the spectrometer.

8. A spectrometer according to claim 4 wherein the first and the second planes are exactly perpendicular to each other.

9. A spectrometer according to claim 4, wherein the first and second optical paths lie in a third plane and the first and third planes intersect to form an acute angle.

10. A spectrometer according to claim 9 wherein the acute angle is between 70° and 85°.

11. A Fourier spectrometer for generating an interference pattern from a measurement beam, the spectrometer comprising:
    a beam splitter for dividing the measurement beam into a first partial beam and a second partial beam;
    a rotatably-mounted rigid pendulum having an axis of rotation;
    a pair of movable retroreflectors, each of the retroreflectors being mounted on the pendulum at equal distances from the pendulum axis so that the pendulum and retroreflectors together have a center of gravity which coincides with the pendulum axis;
    a pair of fixed deflecting mirrors, each of the deflecting mirrors being physically located between the beam splitter and the retroreflectors so that the first partial beam travels along a first optical path and is deflected from one of the pair of fixed mirrors along a second optical path onto one of the pair of retroreflectors where the first partial beam is reversed in direction to retrace the first and second optical paths and return to the beam splitter and the second partial beam travels along a third optical path, is deflected from one of the pair of fixed mirrors along a fourth optical path onto one of the pair of retroreflectors where the second partial beam is reversed in direction to retrace the third and fourth optical paths and return to the beam splitter and wherein the first and third optical paths lie in a first plane, the second and fourth optical paths lie in a second plane and the first and the second plane are substantially perpendicular and the pendulum axis is parallel to the first plane.

12. A spectrometer according to claim 11 wherein each retroreflector has a corner and the angle between one retroreflector corner and the pendulum axis and the pendulum axis and the other retroreflector corner is between 180° and 270°.

13. A spectrometer according to claim 12 wherein the angle between one retroreflector corner and the pendulum axis and the pendulum axis and the other retroreflector corner is between 180° and 210°.

14. A spectrometer according to claim 12 further comprising an alignment mechanism for moving the deflecting mirrors to align the spectrometer.

15. A spectrometer according to claim 14 wherein the first and the second planes are exactly perpendicular to each other.

16. A spectrometer according to claim 15, wherein the first and second optical paths lie in a third plane and the first and third planes intersect to form an acute angle.

17. A spectrometer according to claim 16 wherein the acute angle is between 70° and 85°.

* * * * *